Oct. 29, 1968 A. KUCKENS 3,408,508
SCR COUNTER FEATURING AMPLIFICATION STAGE TO COMPENSATE FOR SIGNAL ATTENUATION OF PRECEDING STAGES
Filed June 16, 1966
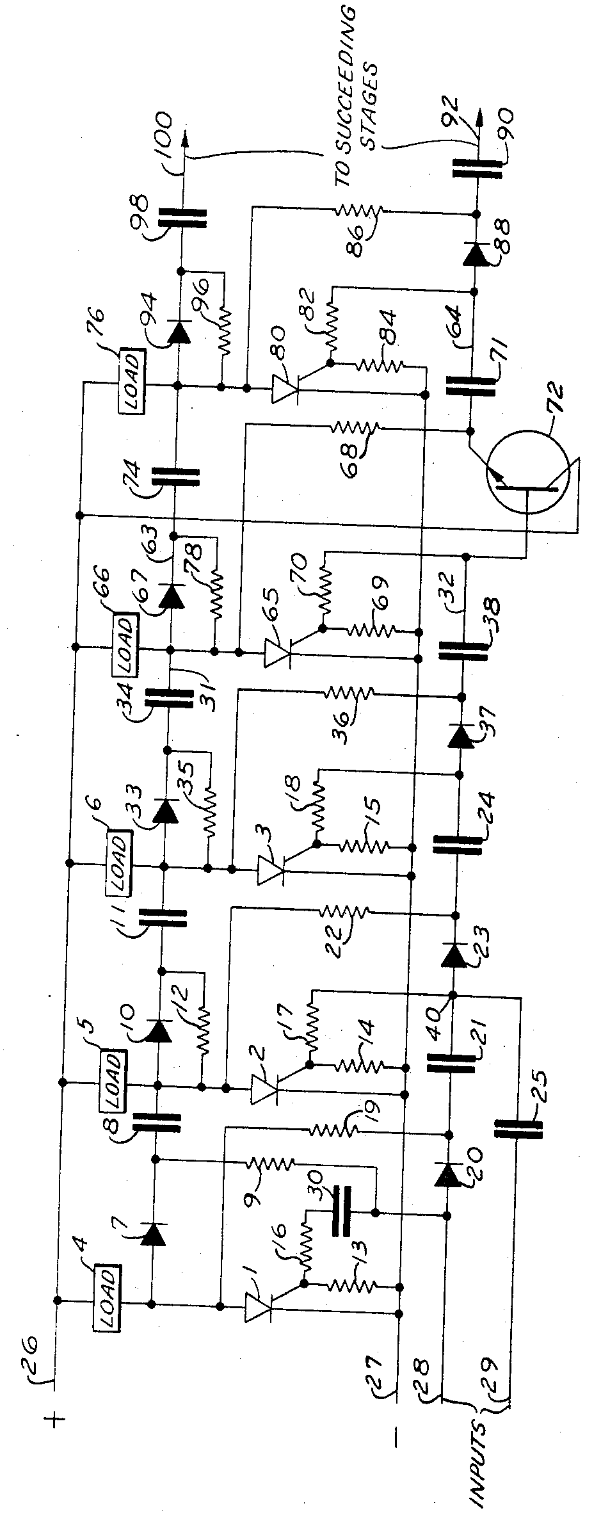

United States Patent Office 3,408,508
Patented Oct. 29, 1968

3,408,508

SCR COUNTER FEATURING AMPLIFICATION STAGE TO COMPENSATE FOR SIGNAL ATTENUATION OF PRECEDING STAGES

Alexander Kuckens, Hamburg, Germany, assignor to National Rejectors, Inc., St. Louis, Mo., a corporation of Missouri Filed June 16, 1966, Ser. No. 557,986
Claims priority, application Germany, June 18, 1965, K 56,403
7 Claims. (Cl. 307—225)

ABSTRACT OF THE DISCLOSURE

A number of electrical stages have input circuits, a plurality of members serially supply input signals to those input stages and are selectively rendered conductive and non-conductive to selectively pass or block the input signals for the various input circuits, and an amplifier provides amplification to compensate for reductions in the amplitude of input signals due to drops across various of the members which precede that amplifier.

This invention relates to improvements in electronic computing and accumulating devices. More particularly, this invention relates to improvements in electronic computing and accumulating devices which use controlled rectifiers.

It is, therefore, an object of the present invention to provide an improved electronic computing and accumulating device which uses controlled rectifiers.

Patent application Ser. No. 531,157 for Electronic Computing and Accumulating Device which was filed by Wolfgang Niehaus on Mar. 2, 1966 discloses an electronic computing and accumulating device that uses controlled rectifiers. The drawing of that application shows three controlled rectifier stages, but the specification of that application points out that additional controlled rectifier stages could be used. The actuating pulses for the last controlled rectifier stage shown in the drawing of the said application must pass serially through a plurality of capacitors and diodes; and the drops across those capacitors and diodes will reduce the amplitude of those pulses. The actuating pulses for the additional controlled rectifier stages would pass through even greater numbers of capacitors and diodes; and the drops across that greater number of capacitors and diodes could reduce the amplitudes of those actuating pulses to levels at which those pulses might be unable to actuate a further controlled rectifier stage. It would be desirable to provide an electronic computing and accumulating device that used controlled rectifiers and that could have any desired number of controlled rectifier stages thereof actuated by actuating pulses that passed serially through a large number of capacitors and diodes. The present invention provides such an electronic computing and accumulating device; and it does so by replacing one of the diodes with an element that performs all of the functions of that diode and also operates as an amplifier. That element will keep pulses from reaching the succeeding controlled rectifier stages, whenever pulses should not reach those succeeding controlled rectifier stages, but will supply amplified pulses to those succeeding controlled rectifier stages whenever pulses should reach those succeeding controlled rectifier stages. It is, therefore, an object of the present invention to provide an electronic computing and accumulating device that has a number of controlled rectifier stages thereof actuated by actuating pulses that pass serially through a large number of capacitors and diodes, and that has one of those diodes replaced by an element that performs all of the functions of that diode and also operates as an amplifier.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

The drawing is a circuit diagram of one preferred embodiment of electronic computing and accumulating device that is made in accordance with the principles and teachings of the present invention.

Referring to the drawing in detail, the numeral 1 denotes a controlled rectifier which is part of a first stage of a preferred embodiment of electronic computing and accumulating device provided by the present invention; and that controlled rectifier is preferably a silicon controlled rectifier. The numerals 2 and 3 denote controlled rectifiers that are parts of the second and third stages of that electronic computing and accumulating device; and those controlled rectifiers also are preferably silicon controlled rectifiers. The numerals 65 and 80 denote controlled rectifiers that are parts of fourth and fifth stages of that electronic computing and accumulating device; and those controlled rectifiers also are preferably silicon controlled rectifiers. The power-handling capacities of the various controlled rectifiers will be selected to enable those controlled rectifiers to easily accommodate all input signals supplied to that electronic computing and accumulating device, and to enable that electronic computing and accumulating device to supply the required amounts of power to the loads controlled by that electronic computing and accumulating device. The numerals 4, 5, 6, 66 and 76 denote loads that are controlled, respectively, by the controlled rectifiers 1, 2, 3, 65 and 80; and those loads could be indicator lamps, relay coils, resistors, or other electrical components.

A diode 7, a capacitor 8, and a resistor 9 constitute a re-setting circuit for the controlled rectifier 1; and a diode 10, a capacitor 11, and a resistor 12 constitute a re-setting circuit for the controlled rectifier 2. A diode 33, a capacitor 34, and a resistor 35 constitute a re-setting circuit for the controlled rectifier 3; and a diode 67, a capacitor 74, and a resistor 78 constitute a re-setting circuit for the controlled rectifier 65. Resistors 13, 14, 15, 69 and 84 are connected, respectively, between the gates and cathodes of the controlled rectifiers 1, 2, 3, 65 and 80; and those cathodes and the lower terminals of those resistors are connected to a conductor 27 which is connected to the negative terminal of a source of direct current. A conductor 26 is connected to the positive terminal of that source of direct current; and that conductor is connected, respectively, to the anodes of the controlled rectifiers 1, 2, 3, 65 and 80 by the loads 4, 5, 6, 66 and 76.

A resistor 16 and a capacitor 30 connect the gate of the controlled rectifier 1 to a conductor 28, which is normally connected to the positive terminal of the source of direct current by a switch, not shown. A resistor 17, a junction 40, a capacitor 21, and a diode 20 connect the gate of the controlled rectifier 2 to the conductor 28. A resistor 18, a capacitor 24, a diode 23, junction 40, capacitor 21, and diode 20 connect the gate of the controlled rectifier 3 to the conductor 28. A resistor 70, a conductor 32, a capacitor 38, a diode 37, capacitor 24, diode 23, junction 40, capacitor 21, and diode 20 connect the gate of the controlled rectifier 65 to the conductor 28. A resistor 82, a conductor 64, a capacitor 71, the emitter-base circuit of an NPN transistor 72, conductor 32, capacitor 38, diode 37, capacitor 24, diode 23, junction 40, capacitor 21, and diode 20 connect the gate of the controlled rectifier 80 to the conductor 28. The resistors 16, 17, 18, 70 and 82 limit the values of the currents flowing through the gate-to-cathode circuits, respectively, of the controlled rectifiers 1, 2, 3, 65 and 80. A capacitor 25 connects the junction 40 to a conductor 29 which is normally connected to the positive terminal of the source of direct current by a second switch, not shown.

The first switch, not shown, must be capable of applying a single negative-going pulse to conductor 28 as it is actuated, and of applying a single positive-going pulse to that conductor as it is released. The second switch, not shown, must be capable of applying a single negative-going pulse to conductor 29 as it is actuated, and of applying a single positive-going pulse to that conductor as it is released. That first switch will preferably correspond to a unit value, such as an authentic German five pfennig coin; whereas that second switch will preferably correspond to a two-unit value, such as an authentic German ten pfennig coin.

A resistor 19 is connected between the anode of the controlled rectifier 1 and the cathode of the diode 20; and that resistor coacts with that diode and the capacitor 21 to constitute an "and" gate which controls the firing of the controlled rectifier 2. A resistor 22 is connected between the anode of the controlled rectifier 2 and the cathode of the diode 23; and that resistor coacts with that diode and the capacitor 24 to constitute an "and" gate which controls the firing of the controlled rectifier 3. A resistor 36 is connected between the anode of the controlled rectifier 3 and the cathode of the diode 37; and that resistor coacts with that diode and the capacitor 38 to constitute an "and" gate which controls the firing of the controlled rectifier 65. A resistor 68 is connected between the anode of the controlled rectifier 65 and the emitter of the transistor 72; and that resistor coacts with that transistor and the capacitor 71 to constitute an "and" gate which controls the firing of the controlled rectifier 80.

The diode 94, the capacitor 98, and the conductor 100 will connect the anode of the controlled rectifier 80 to the anode of the controlled rectifier of the sixth stage, not shown. The diode 88, the capacitor 90, and the conductor 92 will connect the capacitor 71 to the current-limiting resistor for the gate-to-cathode circuit of the controlled rectifier of that sixth stage. The resistor 86 will be connected between the anode of the controlled rectifier 80 and the cathode of the diode 88; and that resistor will coact with that diode and the capacitor 90 to constitute an "and" gate that could control the firing of the controlled rectifier of the sixth stage. In addition, the resistor 96 will be connected between the anode of the controlled rectifier 80 and the capacitor 98.

It will be noted that the capacitor 25 connects the conductor 29 to the current-limiting resistor 17 for the controlled rectifier 2 and not to the current-limiting resistor 16 for the controlled rectifier 1. As a result, pulses which the second switch applies to the conductor 29 will bypass the controlled rectifier 1.

Prior to the time the first switch or the second switch is actuated, the controlled rectifiers 1, 2, 3, 65 and 80 will be non-conductive, positive voltages will be applied to the conductors 26, 28 and 29, capacitor 30 will be charged with the lower terminal positive, and capacitors 21, 24, 25 and 38 will be charged with the left-hand terminals thereof positive. Also, the load 4 and resistor 19 make the voltage at the cathode of diode 20 close to the voltage applied to conductor 26. Similarly, the load 5 and resistor 22 make the voltage at the cathode of diode 23 close to the voltage applied to conductor 26. The load 6 and the resistor 36 make the voltage at the cathode of the diode 37 close to the voltage applied to conductor 26; and the load 66 and the resistor 68 make the voltage at the emitter of the transistor 72 close to the voltage applied to conductor 26. At this time, the electronic computing and accumulating device is in switching condition I; and that switching condition corresponds to a binary count of 0.

If the first switch is actuated, it will apply a negative-going pulse to conductor 28; and a small amount of current will flow from conductor 26 via load 4, diode 7, and resistor 9 to the conductor 28. Also, a small amount of current will flow from conductor 26 via load 5, capacitor 8, and resistor 9 to conductor 28; and that flow of current will charge the capacitor 8 with the right-hand terminal thereof positive. In addition, capacitor 30 will discharge via conductor 28, the first switch, conductor 27, and resistors 13 and 16. The discharging of the capacitor 30 will make the voltage at the anode of diode 20 less positive than the voltage at the cathode of that diode; and hence that diode will be back-biased and will become non-conductive.

When the first switch is released, and a positive-going pulse is applied to the conductor 28, that pulse will be applied to the capacitors 8 and 30; but that pulse will not be applied to the capacitor 21, because the diode 20 will be non-conductive. That pulse will cause the voltage at the left-hand terminal of the capacitor 8 to approach the voltage applied to the conductor 28; and that capacitor will discharge via load 5, load 4, and diode 7. That pulse also will cause the capacitor 30 to charge; and hence current will flow from conductor 28 via capacitor 30, resistor 16, and resistor 13 to conductor 27. The resulting voltage drop across resistor 13 will be great enough to cause sufficient current to flow through the gate-to-cathode circuit of the controlled rectifier 1 to render that controlled rectifier conductive. As that controlled rectifier becomes conductive, the load 4 will become energized, and the voltage at the anode of that controlled rectifier, and hence at the cathode of diode 20, will closely approach zero. Thereupon that diode will be forward-biased and will become conductive. Also, the capacitor 21 will discharge via resistor 19, controlled rectifier 1 and resistors 14 and 17. The voltage at the anode of the diode 23 will then be less positive than the voltage at the cathode thereof, and hence that diode will be back-biased and will become non-conductive. At this time, the electronic computing and accumulating device will be in switching condition II; and that switching condition corresponds to a binary count of 1.

The controlled rectifier 1 functions like a bi-stable flip-flop. Specifically, when that controlled rectifier is non-conductive, the load 4 does not have any current flowing through it, and the voltage at the anode of that controlled rectifier is the same as the supply voltage. That condition of that controlled rectifier corresponds to the condition of a bi-stable flip-flop which denotes a binary count of 0. When the controlled rectifier 1 is conductive, the load 4 becomes energized; and the voltage at the anode of that controlled rectifier drops close to zero. That condition of that controlled rectifier corresponds to the condition of a bi-stable flip-flop which denotes a binary count of 1.

In contrast to a bi-stable flip-flop, a controlled rectifier has only one output; and hence the second output customarily associated with a bi-stable flip-flop is not present in any of the stages of the electronic computing and accumulating device provided by the present invention. However, that second output is not necessary in that electronic computing and accumulating device. Each stage of the electronic computing and accumulating device of the present invention can provide the same coding that a bi-stable flip-flop can provide.

When the first switch is actuated a second time, a second negative-going pulse will be applied to the conductor 28; and a small amount of current will flow from conductor 26 via load 4, diode 7, and resistor 9 to the conductor 28. Also, a small amount of current will flow from conductor 26 via load 5, capacitor 8, and resistor 9 to conductor 28; and that flow of current will charge the capacitor 8 with the right-hand terminal thereof positive. In addition, capacitor 30 will discharge via conductor 28, the first switch, conductor 27, and resistors 13 and 16. The voltage at the anode of diode 20 will be close to zero, but the voltage at the cathode of that diode also will be close to zero.

When the first switch is released for the second time, a second positive-going pulse will be applied to the conductor 28; and that pulse will be applied to the capacitors 8, 30 and 21. That pulse will cause the capacitor 30 to charge; and hence current will flow from conductor 28 via capacitor 30, resistor 16, and resistor 13 to conductor 27. The resulting voltage drop across resistor 13 will not be significant at this time because the controlled rectifier 1 is already conductive. That pulse also will cause the capacitor 21 to charge; and hence current will flow from conductor 28 via diode 20, capacitor 21, resistor 17, and resistor 14 to the conductor 27. The resulting voltage drop across the resistor 14 will cause sufficient current to flow through the gate-to-cathode circuit of the controlled rectifier 2 to render that controlled rectifier conductive. Thereupon the load 5 will become energized.

As the controlled rectifier 2 becomes conductive, the charge on the capacitor 8 will force some current to flow from the right-hand terminal of that capacitor via controlled rectifier 2, inversely through controlled rectifier 1, and diode 7 to the left-hand terminal of that capacitor. The resulting flow of inverse current through the controlled rectifier 1 will render that controlled rectifier non-conductive; and hence the load 4 will become de-energized. Also, current will flow from conductor 26 via load 4, diode 7, capacitor 8 and controlled rectifier 2 to the conductor 27, and current will flow from conductor 28 via resistor 9, capacitor 8, and controlled rectifier 2 to conductor 27; and, very quickly, that current will fully discharge the capacitor 8 and then charge that capacitor with the left-hand terminal thereof positive. When the capacitor 8 is fully charged, with the left-hand terminal thereof positive, the voltage at the anode of the controlled rectifier 1 will again be substantially equal to the voltage at the conductor 26. However, that controlled rectifier will remain non-conductive, because the capacitor 30 will have become charged with the lower terminal positive and the upper terminal close to zero.

As the controlled rectifier 2 becomes conductive, current will flow from conductor 26 via load 6, capacitor 11, resistor 12, and controlled rectifier 2 to the conductor 27; and that current will charge that capacitor with the right-hand terminal thereof positive. Also, as the controlled rectifier 2 becomes conductive, the voltage at the anode thereof, and hence at the cathode of diode 23, will closely approach zero. Thereupon, that diode will be forward-biased and will become conductive. Also, the capacitor 24 will discharge via resistor 22, controlled rectifier 2, and resistors 15 and 18. At the time the controlled rectifier 1 became non-conductive, the voltage at the anode thereof, and hence at the cathode of diode 20 closely approached the voltage at the conductor 26; and that diode thus became back-biased and was rendered non-conductive.

At this time, the load 4 will be de-energized and the load 5 will be energized. This means that the electronic computing and accumulating device is in switching condition III; and that switching condition corresponds to a binary count of 10.

When the first switch is actuated a third time, a third negative-going pulse will be applied to the conductor 28, and a small amount of current will flow from conductor 26 via load 4, diode 7, and resistor 9 to the conductor 28. Also, capacitor 8 will discharge via resistor 9, conductor 28, and the first switch to the conductor 27. In addition, capacitor 30 will discharge via conductor 28, the first switch, conductor 27, and resistors 13 and 16. The discharging of the capacitor 30 will make the voltage at the anode of diode 20 less positive than the voltage at the cathode of that diode; and hence that diode will be back-biased and will become non-conductive.

When the first switch is released, and a third positive going pulse is applied to the conductor 28, that pulse will be applied to the capacitors 8 and 30; but that pulse will not be applied to the capacitor 21, because the diode 20 will be non-conductive. That pulse will cause the capacitor 30 to charge and hence current will flow from conductor 28 via capacitor 30, resistor 16, and resistor 13 to conductor 27. The voltage drop across resistor 13 will be great enough to cause sufficient current to flow through the gate-to-cathode circuit of the controlled rectifier 1 to render that controlled rectifier conductive. As that controlled rectifier becomes conductive, the load 4 will become energized once again.

As the controlled rectifier 1 again becomes conductive, the capacitor 8 will tend to cause current to flow through that controlled rectifier and inversely through the controlled rectifier 2. However, the diode 7 will prevent such inverse current flow; and hence the controlled rectifier 2 will remain conductive. Also, the voltage at the anode of the controlled rectifier 1, and hence at the cathode of diode 20, will again closely approach zero; and, once again, that diode will be forward-biased and will become conductive. Further, the capacitor 21 will discharge via resistor 19, controlled rectifier 1, and resistors 14 and 17. At this time, the loads 4 and 5 will both be energized, and the electronic computing and accumulating device will be in switching condition IV; and that switching condition corresponds to a binary count of 11.

When the first switch is actuated a fourth time, a fourth negative-going pulse will be applied to the conductor 28; and that negative-going pulse will be applied to the capacitors 8, 30, 21 and 24. The application of that negative-going pulse to the latter two capacitors will not be significant, because those capacitors were discharged previously. The application of that negative-going pulse to the capacitor 30 also is not significant, because the controlled rectifier 1 is conductive. Similarly, the application of that negative-going pulse to the capacitor 8 is not significant, because the voltage at the right-hand terminal of that capacitor is close to zero.

When the first switch is released for the fourth time, a fourth positive-going pulse will be applied to the conductor 28; and that positive-going pulse will charge the capacitors 30, 21 and 24. The charging of the capacitors 30 and 21 will not be significant, because the controlled rectifiers 1 and 2 are conductive. The charging of the capacitor 24 will cause current to flow from conductor 28 via diode 20, capacitor 21, diode 23, capacitor 24, resistor 18, and resistor 15 to the conductor 27; and the resulting voltage drop across the resistor 15 will be great enough to cause sufficient gate-to-cathode current to flow through the controlled rectifier 3 to render that controlled rectifier conductive. Thereupon, load 6 will become energized.

Also, current will flow from the right-hand terminal of capacitor 11 via controlled rectifier 3, inversely through controlled rectifier 2 and the diode 10 to the left-hand terminal of that capacitor; and further current will flow from the right-hand terminal of capacitor 11 via controlled rectifier 3, inversely through controlled rectifier 1, diode 7, capacitor 8, and diode 10 to the left-hand terminal of that capacitor. That inverse current flow will render both the controlled rectifiers 1 and 2 non-conductive; and thereupon the loads 4 and 5 will become deenergized. At this time, only the load 6 will be energized, and the electronic computing and accumulating device will be in switching condition V; and that switching condition corresponds to a binary count of 100.

As the controlled rectifier 3 becomes conductive, current will flow from conductor 26 via load 66, conductor 31, capacitor 34, resistor 35, and controlled rectifier 3 to the conductor 27; and that current will charge that capacitor with the right-hand terminal thereof positive. Also, as the controlled rectifier 3 becomes conductive, the voltage at the anode thereof, and hence at the cathode of diode 37, will closely approach zero. Thereupon, capacitor 38 will discharge via resistor 36, controlled rectifier 3, and resistors 69 and 70.

As the controlled rectifiers 1 and 2 became non-conductive, the voltages at the anodes thereof, and hence at the cathodes of the diodes 20 and 23, closely approached the positive voltage at conductor 26. As a result, the forward-biasing which those diodes experienced while the controlled rectifiers 1 and 2 were conductive will be eliminated. The positive voltage at the anode of controlled rectifier 2 will coact with the low voltage at the anode of the controlled rectifier 3 to forward-bias the diode 37.

When the first switch is actuated a fifth time, a fifth negative-going pulse will be applied to the conductor 28; and that negative-going pulse will be applied to the capacitors 8 and 30 but will not be applied to the capacitor 21 because the diode 20 will be back-biased. That negative-going pulse will discharge the capacitor 30, and it will cause the capacitor 8 to charge with the right-hand terminal thereof positive.

When the first switch is released a fifth time, the capacitor 30 will be charged and will cause the controlled rectifier 1 to become conductive again. Thereupon the load 4 will become energized again. Also as the controlled rectifier 1 again becomes conductive, the capacitor 8 will discharge via load 5, load 4, and diode 7. At this time both of the loads 6 and 4 will be energized, and hence the electronic computing and accumulating device will be in switching condition VI; and that switching condition corresponds to a binary count of 101.

As the controlled rectifier 1 again becomes conductive, the voltage at the anode thereof, and hence at the cathode of the diode 20 and at the anode of the diode 23, will again approach zero. As a result, the diode 20 will again be forward-biased and will again become conductive, whereas the diode 23 will again be back-biased and will again become non-conductive.

When the first switch is actuated a sixth time, a sixth negative-going pulse will be applied to the conductor 28; and that negative-going pulse will be applied to the capacitors 8, 30 and 21 but will not be applied to the capacitor 24, because the diode 23 is non-conductive. That negative-going pulse will charge the capacitor 8 with the right-hand terminal thereof positive, it will discharge the capacitor 30, and it will discharge the capacitor 21.

When the first switch is released a sixth time, a sixth positive-going pulse will charge the capacitor 30; but the charging of that capacitor will not be significant because the controlled rectifier 1 is already conductive. That positive-going pulse will charge the capacitor 21, and the charging of that capacitor will cause the controlled rectifier 2 to become conductive. Thereupon, the load 5 will become energized.

As the controlled rectifier 2 again becomes conductive, the capacitor 8 will cause current to flow via controlled rectifier 2, inversely through controlled rectifier 1, and diode 7; and that inverse current flow will again render the controlled rectifier 1 non-conductive. Thereupon, the load 4 will become de-energized. This means that only the loads 5 and 6 will be energized; and the electronic computing and accumulating device will be in switching condition VII, and that switching condition corresponds to a binary count of 110.

As the controlled rectifier 2 again became conductive, current flowed from the left-hand terminal of capacitor 11 via resistor 12, controlled rectifier 2, and inversely through controlled rectifier 3 to the right-hand terminal of that capacitor; but the capacitance of capacitor 11 and the resistance of resistor 12 are such that the value of that current is too low to render the controlled rectifier 3 non-conductive. Also, as the controlled rectifier 1 again became non-conductive, the voltage at the anode thereof, and hence at the cathode of the diode 20, closely approached the voltage at the conductor 26. As a result, the forward-biasing which that diode experienced while the controlled rectifier 1 was conductive was eliminated.

When the first switch is actuated a seventh time, a seventh negative-going pulse will be applied to the conductor 28; and that negative-going pulse will be applied to capacitor 8 and 30 but will not be applied to the capacitor 21, because the diode 20 is non-conductive. That negative-going pulse will discharge the capacitor 30; and it will discharge the capacitor 8 because the voltage at the right-hand terminal of that capacitor is close to zero.

When the first switch is released a seventh time, a seventh positive-going pulse will be applied to the conductor 28; and that positive-going pulse will charge the capacitor 30 and cause that capacitor to render the controlled rectifier 1 conductive again. Thereupon, the load 4 will become energized. At this time, all of the loads 4, 5 and 6 will be energized, and the electronic computing and accumulating device will be in switching condition VIII, and that switching condition corresponds to a binary count of 111.

As the controlled rectifier 1 again became conductive, the capacitor 8 tended to cause current to flow via controlled rectifier 1 and inversely through controlled rectifier 2; but the diode 7 prevented such flow. Also as the controlled rectifier 1 again became conductive, the voltage at the anode thereof, and hence at the cathode of the diode 20, again closely approached zero; and hence that diode again became conductive. The diodes 23 and 37 also have the voltages at the cathodes thereof close to zero, and hence those diodes also are conductive.

When the first switch is actuated an eighth time, an eighth negative-going pulse will be applied to the conductor 28; and that negative-going pulse will be applied to the capacitors 8, 30, 21, 24 and 38 but will not be applied to the capacitor 71 because the transistor 72 is non-conductive—that transistor being non-conductive as long as the controlled rectifier 65 remains non-conductive and thus maintains the voltage at the emitter of that transistor close to the voltage at the conductor 26. That eighth negative-going pulse will charge the capacitor 8 with the right-hand terminal thereof positive and will discharge the capacitor 30.

When the first switch is released an eighth time, an eighth positive-going pulse will be applied to the conductor 28; and that positive-going pulse will charge the capacitor 38. The charging of the capacitor 38 will cause current to flow from conductor 28 via diode 20, capacitor 21, diode 23, capacitor 24, diode 37, capacitor 38, conductor 32, and resistor 70 and 69 to the conductor 27; and the resulting voltage drop across the resistor 69 will be great enough to cause sufficient gate-to-cathode current to flow through the controlled rectifier 65 to render that controlled rectifier conductive. Thereupon, the load 66 will become energized.

As the controlled rectifier 65 becomes conductive, the charge on the capacitor 34 will force some current to flow from the right-hand terminal of that capacitor via controlled rectifier 65, inversely through controlled rectifier 3 and diode 33 to the left-hand terminal of that capacitor. The resulting flow of inverse current through the controlled rectifier 3 will render that controlled rectifier non-conductive; and hence the load 6 will become de-energized. Also, the charge on capacitor 34 will force some current to flow from the right-hand terminal of that capacitor via controlled rectifier 65, inversely through controlled rectifier 2, diode 10, capacitor 11 and diode 33 to the left-hand terminal of that capacitor. The resulting flow of inverse current through the controlled rectifier 2 will render that controlled rectifier non-conductive; and hence the load 5 will become de-energized. In addition, the charge on capacitor 34 will force some current to flow from the right-hand terminal of that capacitor via controlled rectifier 65, inversely through controlled rectifier 1, diode 7, capacitor 8, diode 10, capacitor 11, and diode 33 to the left-hand terminal of that capacitor. The resulting flow of inverse current through the controlled rectifier 1 will render that controlled rectifier non-conductive; and hence the load 4 will become de-energized. Further, current will flow from conductor 26 via load 76, capacitor 74, resistor 78, and controlled rectifier 65 to the conductor 27; and that current flow will make the right-hand terminal of that capacitor positive. The resistor 68 will apply the relatively low voltage at the anode of the controlled rectifier 65 to the emitter of the transistor 72, and thus enable a positive-going pulse applied to the base of that transistor to render that transistor conductive.

As the controlled rectifiers 1, 2 and 3 became non-conductive, the voltages at the anodes thereof, and hence at the cathodes of the diodes 20, 23 and 37 closely approached the positive voltage at conductor 26. As a result, the forward-baising which those diodes experienced while the controlled rectifiers 1, 2 and 3 were conductive will be eliminated. At this time, only the load 66 will be energized, and the electronic computing and accumulating device will be in switching condition IX; and that switching condition corresponds to a binary count of 1000.

When the first switch is actuated a ninth time, a ninth negative-going pulse followed by a ninth positive-going pulse will render the controlled rectifier 1 conductive—in the manner in which the fifth negative-going and positive-going pulses rendered that controlled rectifier conductive. At this time, the loads 4 and 66 will be energized, and the electronic computing and accumulating device will be in switching condition X; and that switching condition corresponds to a binary count of 1001.

When the first switch is actuated a tenth time, a tenth negative-going pulse followed by a tenth positive-going pulse will render the controlled rectifier 2 conductive and will render the controlled rectifier 1 non-conductive—in the manner in which the sixth negative-going and positive-going pulses rendered those controlled rectifiers conductive and non-conductive, respectively. At this time, the loads 5 and 66 will be energized, and the electronic computing and accumulating device will be in switching condition XI; and that switching condition corresponds to a binary count of 1010.

When the first switch is actuated an eleventh time, an eleventh negative-going pulse followed by an eleventh positive-going pulse will render the controlled rectifier 1 conductive—in the manner in which the seventh negative-going and positive-going pulses rendered that controlled rectifier conductive. At this time, the loads 4, 5 and 66 will be energized, and the electronic computing and accumulating device will be in switching condition XII; and that switching condition corresponds to a binary count of 1011.

When the first switch is actuated a twelfth time, a twelfth negative-going pulse followed by a twelfth positive-going pulse will render the controlled rectifier 3 conductive and will render the controlled rectifiers 1 and 2 non-conductive—in the manner in which the fourth negative-going and positive-going pulses rendered that controlled rectifier conductive and those controlled rectifiers non-conductive, respectively. At this time, the loads 6 and 66 will be energized and the electronic computing and accumulating device will be in switching condition XIII; and that switching condition corresponds to a binary count of 1100.

When the first switch is actuated a thirteenth time, a thirteenth negative-going pulse followed by a thirteenth positive-going pulse will render the controlled rectifier 1 conductive—in the manner in which the fifth negative-going and postive-going pulses rendered that controlled rectifier conductive. At this time, the loads 4, 6 and 66 will be energized, and the electronic computing and accumulating device will be in switching condition XIV; and that switching condition corresponds to a binary count of 1101.

When the first switch is actuated a fourteenth time, a fourteenth negative-going pulse followed by a fourteenth positive-going pulse will render the controlled rectifier 2 conductive and will render the controlled rectifier 1 non-conductive—in the manner in which the sixth negative-going and positive-going pulses rendered that controlled rectifier conductive and rendered that controlled rectifier non-conductive, respectively. At this time, the loads 5, 6 and 66 will be energized, and the electronic computing and accumulating device will be in switching condition XV; and that switching condition corresponds to a binary count of 1110.

When the first switch is actuated a fifteenth time, a fifteenth negative-going pulse followed by a fifteenth positive-going pulse will render the controlled rectifier 1 conductive—in the manner in which the seventh negative-going and positive-going pulses rendered that controlled rectifier conductive. At this time, the loads 4, 5, 6 and 66 will be energized, and the electronic computing and accumultaing device will be in switching condition XVI; and that switching condition corresponds to a binary count of 1111.

When the first switch is actuated a sixteenth time, a sixteenth negative-going pulse followed by a sixteenth positive-going pulse will render the transistor 72 conductive. The resulting sharp rise in voltage at the emitter of that transistor will cause a substantial current pulse to flow through capacitor 71, conductor 64, and resistors 82 and 84 to the conductor 27; and the resulting voltage drop across the resistor 84 will be great enough to cause sufficient gate-to-cathode current to flow through the controlled rectifier 80 to render that controlled rectifier conductive. Thereupon, the load 76 will become energized.

As the controlled rectifier 80 becomes conductive, the charge on the capacitor 74 will force some current to flow from the right-hand terminal of that capacitor via controlled rectifier 80, inversely through controlled rectifier 65, diode 67 and conductor 63 to the left-hand terminal of that capacitor. The resulting flow of inverse current through the controlled rectifier 65 will render that controlled rectifier non-conductive; and hence the load 66 will become de-energized. Also, the charge on capacitor 74 will force some current to flow from the right-hand terminal of that capacitor via controlled rectifier 80, inversely through controlled rectifier 3, diode 33, capacitor 34, conductor 31, diode 67, and conductor 63 to the left-hand terminal of that capacitor. The resulting flow of inverse current through the controlled rectifier 3 will render that controlled rectifier non-conductive; and hence the load 6 will become de-energized. In addition, the charge on the capacitor 74 will force some current to flow from the right-hand terminal of that capacitor via controlled rectifier 80, inversely through controlled rectifier 2, diode 10, capacitor 11, diode 33, capacitor 34, conductor 31, diode 67, and conductor 63 to the left-hand terminal of that capacitor. The resulting flow of inverse current through the controlled rectifier 2 will render that controlled rectifier non-conductive; and hence the load 5 will become de-energized. Further, the charge of the capacitor 74 will force some current to flow from the right-hand terminal of that capacitor via controlled rectifier 80, inversely through controlled rectifier 1, diode 7, capacitor 8, diode 10, capacitor 11, diode 33, capacitor 34, conductor 31, diode 67, and conductor 63 to the left-hand terminal of that capacitor. The resulting flow of inverse current through the controlled rectifier 1 will render that controlled rectifier non-conductive; and hence the load 4 will become de-energized. At this time, only the load 76 will be energized, and the electronic computing and accumulating device will be in switching condition XVII; and that switching condition corresponds to a binary count of 10000.

If the first switch is then actuated the seventeenth through the thirty-first times, the controlled rectifiers 1, 2, 3, and 65 will be rendered conductive and non-conductive in the manner in which those controlled rectifiers were rendered conductive and non-conductive by the first through the fifteenth negative-going and positive-going pulses. At the conclusion of the thirty-first positive-going pulse, all of the loads 4, 5, 6, 66 and 76 will be energized, and the electronic computing and accumulating device will be in switching condition XXXII; and that switching condition corresponds to a binary count of 11111.

The amplitude of the negative-going and positive-going pulses supplied to the capacitor 21 will be smaller than the amplitude of the negative-going and positive-going pulses supplied to the capacitor 30, because of the drop across diode 20. The amplitude of the negative-going and positive-going pulses supplied to the capacitor 24 will be still smaller, because of the drop across diode 23 plus the drop across the capacitor 21; and the amplitude of the negative-going and positive-going pulses supplied to the capacitor 38 will be even smaller, because of the drop across diode 37 plus the drop across the capacitor 24. The combined drops across the diodes 20, 23 and 37 and across the capacitors 21 and 24 will not be great enough to reduce the amplitude of the negative-going and positive-going pulses supplied to the capacitor 38 to such a low level that the said positive-going pulses can not develop the voltage drop across the resistor 69 which is needed to render the controlled rectifier 65 conductive.

However, if the transistor 72 had not been used to supplant the diode that otherwise would couple the conductor 32 to the capacitor 71, the added drop across that diode might have reduced the amplitude of the negative-going and positive-going pulses supplied to the capacitor 71 to such a low level that the said positive-going pulses might not develop the voltage drop across the resistor 84 which is needed to render the controlled rectifier 80 conductive. Moreover, if still further controlled rectifier stages were to be added to the electronic computing and accumulating device, that electronic computing and accumulating device would—in the absence of an amplifier such as transistor 72—be unable to supply pulses to the last stage thereof which would be large enough to "fire" the controlled rectifier of that last stage. However, by including the transistor 72, the electronic computing and accumulating device of the present invention can supply positive-going pulses to the capacitor 71 and to the succeeding capacitors, such as the capacitor 90, with amplitudes that are as large as, or larger than, the amplitudes of the positive-going pulses supplied to the capacitor 30 and the succeeding capacitors. As a result, the transistor 72 positively obviates any and all failure of the controlled rectifiers, of the electronic computing and accumulating device, to "fire" because of reductions in the amplitudes of the positive-going pulses due to the drops across the diodes and capacitors of that electronic computing and accumulating device.

It will be noted that the transistor 72 performs a dual function. Specifically, that transistor supplies amplified positive-going pulses to the capacitor 71 and to the succeeding capacitors, such as the capacitor 90; and that transistor also coacts with the resistor 68 to selectively "gate" the positive-going pulses which are applied to the base thereof. Thus, that transistor and that resistor will coact, whenever the controlled rectifier 65 is non-conductive, to render that transistor non-conductive to block any positive-going pulses which are applied to the base thereof; and that transistor and that resistor will coact, whenever the controlled rectifier 65 is conductive, to enable that transistor to respond to positive-going pulses which are applied to the base thereof to become conductive and apply amplified pulses to the capacitor 71.

If an additional controlled rectifier is not added to the circuit shown by the drawing, the hereinbefore-described switching conditions will constitute all of the switching conditions that will be experienced by the electronic computing and accumulating device. To re-set that electronic computing and accumulating device, the voltage that is applied to the terminal 26 will be removed; and, thereupon, all of the controlled rectifiers 1, 2, 3, 65 and 80 will become non-conductive, and the capacitors 8, 11, 34, 71, 74, 90 and 98 will become discharged.

In the preceding description, it was assumed that pulses were supplied only to the conductor 28, and that no pulses were supplied to the conductor 29. However, pulses can be applied to either or both of the conductors 28 and 29. For example, a negative-going pulse can be applied to the conductor 29 at a time when all of the controlled rectifiers 1, 2, 3, 65 and 80 are non-conductive and all of the capacitors 21, 24, 25, 30 and 38 are charged. That negative-going pulse will discharge the capacitor 25 via conductor 29, the second switch, conductor 27, and then either through resistors 13 and 16, capacitor 30, diode 20, and capacitor 21 or through resistors 14 and 17.

An ensuing positive-going pulse that is applied to the conductor 29 will cause the capacitor 25 to charge; and current will then flow via resistor 17 and resistor 14 to the conductor 27. The resulting voltage drop across the resistor 14 will be great enough to cause sufficient current to flow through the gate-to-cathode circuit of the controlled rectifier 2 to render that controlled rectifier 2 conductive. Thereupon, the load 5 will become energized.

Current could not flow from conductor 29 via capacitor 25, junction 40, capacitor 21, diode 20, capacitor 30, and resistors 16 and 13 to the conductor 27, because diode 20 would block any such current flow. As a result, only the load 5 will be energized by that positive-going pulse; and hence the electronic computing and accumulating device will be in switching condition III, which corresponds to a binary count of 10.

As the controlled rectifier 2 became conductive, current flowed from conductor 26 via load 6, capacitor 11, resistor 12 and controlled rectifier 2 to conductor 27; and that capacitor became charged with the right-hand terminal thereof positive. Also, as that controlled rectifier became conductive, the voltage at the anode thereof, and hence at the cathode of the diode 23, approached zero, thereby rendering that diode conductive.

When a second negative-going pulse is applied to the conductor 29, it will discharge the capacitor 25.

When a second positive-going pulse is applied to the conductor 29, it will charge the capacitor 25 and it will also charge the capacitor 24. The charging of capacitor 25 will not be significant, because the controlled rectifier 2 is already conductive. The charging of capacitor 24 will cause current to flow via conductor 29, capacitor 25, junction 40, diode 23, capacitor 24, and resistors 18 and 15 to the conductor 27. The resulting flow of current through resistor 15 will provide a voltage drop which is great enough to cause sufficient current to flow through the gate-to-cathode circuit of controlled rectifier 3 to render that controlled rectifier conductive. The load 6 will thereupon become energized.

As the controlled rectifier 3 became conductive, current flowed from the right-hand terminal of capacitor 11 via that controlled rectifier, inversely through controlled rectifier 2, and diode 10 to the left-hand terminal of that capacitor; and that current flow rendered the controlled rectifier 2 non-conductive, thereby de-energizing the load 5. At this time only the load 6 will be energized; and hence the electronic computing and accumulating device will be in switching condition V, and that switching condition corresponds to a binary count of 100.

As the controlled rectifier 2 became non-conductive, the voltage at the anode thereof, and hence at the cathode of the diode 23, closely approached the voltage applied to the conductor 26. As a result the forward-biasing, which that diode experienced while the controlled rectifier 2 was conductive, was eliminated.

When a third negative-going pulse is applied to the conductor 29, it will not affect the capacitor 24 but it will discharge the capacitor 25. An ensuing third positive-going pulse that is applied to the conductor 29 will cause current to flow through capacitor 25 and resistors 17 and 14 to the conductor 27; and the resulting voltage drop across the resistor 14 will again be great enough to cause sufficient current to flow through the gate-to-cathode circuit of the controlled rectifier 2 to render that controlled rectifier conductive. Thereupon, the load 5 will again become energized. At this time, both of the loads 5 and 6 will be enerized; and hence the electronic computing and accumulating device will be in switching condition VII, which switching condition corresponds to a binary count of 110.

Prior to the time the controlled rectifier 2 again became conductive, current flowed from conductor 26 via load 5, diode 10, capacitor 11, and controlled rectifier 3 to conductor 27 to charge that capacitor with the left-hand terminal thereof positive. As the controlled rectifier 2 then became conductive, current flowed from the left-hand terminal of capacitor 11 via resistor 12, controlled rectifier 2, and inversely through controlled rectifier 3 to the right-hand terminal of that capacitor; but the capacitance of capacitor 11 and the resistance of resistor 12 limit the value of that current to such a low level that the controlled rectifier 3 will remain conductive. Also as the controlled rectifier 2 became conductive, the voltage at the anode thereof, and hence at the cathode of the diode 23, approached zero. Consequently that diode again became forward-biased and again became conductive.

When a fourth negative-going pulse is applied to the conductor 29, it will discharge the capacitor 25. When a fourth positive-going pulse is applied to the conductor 29, it will charge the capacitors 25, 24 and 38. The charging of the capacitors 25 and 24 will not be significant because the controlled rectifiers 2 and 3 are already conductive. The charging of capacitor 38 will cause current to flow via conductor 29, capacitor 25, junction 40, diode 23, capacitor 24, diode 37, capacitor 38, conductor 32, and resistors 70 and 69 to the conductor 27. The resulting flow of current through resistor 69 will provide a voltage drop which will be great enough to cause sufficient current to flow through the gate-to-cathode circuit of controlled rectifier 65 to render that controlled rectifier conductive. The load 66 will thereupon become energized.

As the controlled rectifier 65 became conductive, current flowed from the right-hand terminal of the capacitor 34—some inversely through controlled rectifier 2 and some inversely through controlled rectifier 3—and then through diode 33 to the left-hand terminal of that capacitor. Thereupon, those controlled rectifiers became non-conductive and the loads 5 and 6 became de-energized. At this time, the load 66 will be energized, and the electronic computing and accumulating device will be in switching condition IX; and that switching condition corresponds to a binary count of 1000.

The application of fifth negative-going and positive-going pulses to the conductor 29 will render controlled rectifier 2 conductive to provide switching condition XI which corresponds to a binary count of 1010. Application of sixth negative-going and positive-going pulses to the conductor 29 will render controlled rectifier 3 conductive and render controlled rectifier 2 non-conductive to provide switching condition XIII which corresponds to a binary count of 1100. The application of seventh negative-going and positive-going pulses to the conductor 29 will render controlled rectifier 2 conductive to provide switching condition XV which corresponds to a binary count of 1110.

When an eighth negative-going pulse is applied to the conductor 29, it will discharge the capacitor 25. When an eighth positive-going pulse is applied to the conductor 29, it will charge the capacitors 25, 24 and 38 and it will render the transistor 72 conductive. The resulting sharp rise in voltage at the emitter of that transistor will cause a substantial current pulse to flow through capacitor 71, conductor 64, and resistors 82 and 84 to the conductor 27; and the resulting voltage drop across the resistor 84 will be great enough to cause sufficient gate-to-cathode current to flow through the controlled rectifier 80 to render that controlled rectifier conductive. Thereupon, the load 76 will become energized.

As the controlled rectifier 80 becomes conductive, the charge on the capacitor 74 will cause current to flow inversely through each of the controlled rectifiers 2, 3 and 65, thereby rendering those controlled rectifiers non-conductive. At this time, only the load 76 will be energized, and the eelctronic computing and accumulating device will be in switching condition XVII; and that switching condition corresponds to a binary count of 10000.

The application of ninth negative-going and positive-going pulses to the conductor 29 will render controlled rectifier 2 conductive to provide switching condition XIX which corresponds to a binary count of 10010. Application of tenth negative-going and positive-going pulses to the conductor 29 will render controlled rectifier 3 conductive and render controlled rectifier 2 non-conductive to provide switching condition XXI which corresponds to a binary count of 10100. The application of eleventh negative-going and positive-going pulses to the conductor 29 will render controlled rectifier 2 conductive to provide switching condition XXIII which corresponds to a binary count of 10110. Application of twelfth negative-going and positive-going pulses to the conductor 29 will render controlled rectifier 65 conductive and render controlled rectifiers 2 and 3 non-conductive to provide switching condition XXV which corresponds to a binary count of 11000. The application of thirteenth negative-going and positive-going pulses to the conductor 29 will render controlled rectifier 2 conductive to provide switching condition XXVII which corresponds to a binary count of 11010. Application of fourteenth negative-going and positive-going pulses to the conductor 29 will render controlled rectifier 3 conductive and render controlled rectifier 2 non-conductive to provide switching condition XXIX which corresponds to a binary count of 11100. The application of fifteenth negative-going and positive-going pulses to the conductor 29 will render controlled rectifier 2 conductive to provide switching condition XXXI which corresponds to a binary count of 11110.

If a negative-going pulse is then applied to the conductor 28, it will be applied to the capacitor 30 and will discharge that capacitor, but it will not be applied to the capacitor 21 because the diode 20 will be rendered non-conductive by the positive voltage at the cathode thereof. That negative-going pulse will also discharge the capacitor 8 via resistor 9, conductor 28 and the first switch to conductor 27.

An ensuing positive-going pulse that is applied to the conductor 28 will cause the capacitor 30 to charge, and will cause current to flow through the resistors 16 and 13. The resulting voltage drop across the resistor 13 will be great enough to cause sufficient current to flow through the gate-to-cathode circuit of the controlled rectifier 1 to render that controlled rectifier conductive. Thereupon, the load 4 will become energized. As the controlled rectifier 1 becomes conductive, the voltage at the anode thereof, and hence at the cathode of diode 20, will closely approach zero and will again forward-bias that diode. At this time, all of the loads 4, 5, 6, 66 and 76 will be energized, and the electronic computing and accumulating device will be in switching condition XXXII, which switching condition corresponds to a binary count of 11111.

If a negative-going pulse is applied to the conductor 29 at a time when the controlled rectifier 1 is conductive but the controlled rectifier 2 is non-conductive, the diode 23 will not be forward-biased; because the voltage at the anode of the controlled rectifier 2, and hence at the cathode of that diode, will be close to the voltage applied to the conductor 26. The voltage at the conductor 28, and hence at the junction between the diode 7 and the capacitor 8, will be positive; and the voltage at the right-hand terminal of that capacitor will be positive, but the voltage at the anode of that diode will be close to zero. As a result, the capacitor 8 will not have a charge stored thereon, and the diode 7 will be back-biased. The negative-going pulse that is applied to the conductor 29 will be applied to the capacitor 25, and it will discharge that capacitor; but that negative-going pulse will not be applied to the capacitor 24, because the diode 23 will be non-conductive, and that negative-going pulse will not be applied to the capacitor 8 because of diode 20.

An ensuing positive-going pulse that is applied to the conductor 29 will charge the capacitor 25, and current will flow through the resistors 17 and 14 to the conductor 27. The resulting voltage drop across the resistor 14 will be great enough to cause sufficient current to flow through the gate-to-cathode circuit of the controlled rectifier 2 to render that controlled rectifier conductive; and, thereupon, the load 5 will become energized.

As the controlled rectifier 2 became conductive, current did not tend to flow from the right-hand terminal of capacitor 8 thereof via the controlled rectifier 2, inversely through controlled rectifier 1, and diode 7 to the left-hand terminal of that capacitor; because that capacitor was not charged. Further, current could not have flowed in that manner, because the diode 7 is back-biased and is non-conductive. This means that the controlled rectifier 1 will continue to be conductive, and that the load 4 will continue to be energized; and hence both the loads 4 and 5 will be energized. In this way, actuation of the second switch, and the resulting application of a negative-going pulse and a positive-going pulse to the conductor 29, will add the value corresponding to the coin which actuated that second switch without disturbing the value previously accumulated by the rendering of the controlled rectifier 1 conductive.

As the controlled rectifier 2 became conductive, the voltage at the anode thereof, and hence at the cathode of the diode 23, dropped close to zero; and hence that diode became forward-biased. Also, the capacitor 11 became charged with the right-hand terminal thereof positive.

If the first switch is then actuated, the resulting application of successive negative-going and positive-going pulses to the conductor 28 will cause the controlled rectifier 3 to become conductive; and, as that controlled rectifier becomes conductive, the capacitor 11 will render both of the controlled rectifiers 1 and 2 non-conductive. At that time, the electronic computing and accumulating device will be in switching condition V, and that swithing condition will correspond to a binary count of 100.

If the second switch, rather than the first switch, had been actuated, the resulting application of successive negative-going and positive-going pulses to the conductor 29 would have caused the controlled rectifier 3 to become conductive; but the capacitor 11 would not have been able to render the controlled rectifier 1 non-conductive, because the diode 7 would be back-biased by the positive voltage which conductor 28 and resistor 9 apply to the cathode thereof. In such event, the electronic computing and accumulating device would be in switching condition VI, and that swithing condition corresponds to a binary count of 101.

If the second switch is again actuated, while the electronic computing and accumulating device is in switching condition VI, the resulting application of successive negative-going and positive-going pulses to the conductor 29 will again cause the controlled rectifier 2 to become conductive; but the capacitor 8 will not be able to render the controlled rectifier 1 non-conductive, because the diode 7 will still be back-biased by the positive voltage which conductor 28 and resistor 9 apply to the cathode thereof. At this time, all of the controlled rectifiers 1, 2 and 3 will be conductive, and hence all of the loads 4, 5 and 6 will be energized. This means that the electronic computing and accumulating device will be in switching condition VIII, and that switching condition will correspond to a binary count of 111.

It will be noted that the application of pulses to the conductor 29 never directly affects the state of conduction of the controlled rectifier 1. Further, it will be noted that the application of pulses to the conductor 29 cannot enable the controlled rectifier 2 to directly affect the state of conduction of the controlled rectifier 1. This is important; because it enables credits, corresponding to the values of coins which actuate the second switch, to be accumulated without any loss of any previously-accumulated credits corresponding to the coins which actuate the first switch.

It should also be noted that the electronic computing and accumulating device provided by the present invention can receive a succession of pulses at the same input thereof, and can automatically apply each of those pulses to the appropriate stage thereof. Thus, when that electronic computing and accumulating device receives the first positive-going pulse from the first switch, it automatically applies that pulse to the first stage to render the controlled rectifier 1 conductive. When that electronic computing and accumulating device receives the second positive-going pulse from that first switch, it automatically applies that pulse to the second stage to render the controlled rectifier 2 conductive. The third positive-going pulse from that first switch is applied to the first stage to again render the controlled rectifier 1 conductive; and the fourth positive-going pulse from that first switch is applied to the third stage to render the controlled rectifier 3 conductive. The fifth positive-going pulse from the first switch is applied to the first stage to again render the controlled rectifier 1 conductive; and the sixth positive-going pulse from that first switch is applied to the second stage to again render the controlled rectifier 2 conductive. Finally, the seventh positive-going pulse from that first switch is applied to the first stage to render the controlled rectifier 1 conductive once again. This shows that the electronic computing and accumulating device provided by the present invention can receive a succession of pulses at a common input and can automatically apply each pulse to the appropriate stage thereof. As a result, that electronic computing and accumulating device does not require a separate input for each stage.

Similarly, a first positive-going pulse from the second switch will be applied to the second stage to render the controlled rectifier 2 conductive; and a second positive-going pulse from that second switch will be applied to the third stage to render the controlled rectifier 3 conductive. A third positive-going pulse from that second switch will be applied to the second stage to again render the controlled rectifier 2 conductive.

The transistor 72 will preferably be a high frequency transistor. Such a transistor can provide sharp wave fronts for the amplified pulses supplied to the capacitor 71 and the succeeding capacitors; and such sharp wave fronts avoid appreciable delays in the firing of controlled rectifier 80 and any succeeding controlled rectifiers.

Whereas the drawing and accompanying description have shown and described a preferred embodiment of the present invention, it should be apparent to those skilled in the art that various changes may be made in the form of the invention without affecting the scope thereof.

What I claim is:

1. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member.

2. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said stages including controlled rectifiers, said input circuits for said stages including resistors connected intermediate the gates and cathodes of said controlled rectifiers.

3. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said members being diodes and said one member being a transistor.

4. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said circuit including capacitors connected between said members and the input circuits of the stages with which said members are associated.

5. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said means including resistors connected between the outputs of said stages and the members associated with said stages.

6. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said members being diodes, said stages including controlled rectifiers, and said means including resistors connected between the anodes of said controlled rectifiers and the cathodes of said diodes.

7. A control circuit that comprises an input terminal to which input signals can be applied, a plurality of stages, each of said stages including an input circuit, a plurality of members that serially supply signals from said input terminal to said input circuits of said stages, said members being selectively rendered conductive and non-conductive to selectively pass or block signals for said input circuits of said stages, said members being alternated with said stages whereby each member is associated with an adjacent stage, and means to selectively render various of said members conductive to enable the said members to apply signals to various of said stages, one of said members being an amplifier, whereby said one member can selectively block signals for the input circuit of the stage with which it is associated or pass amplified signals to said input circuit for said stage, said one member providing amplification sufficient to compensate for reductions in the amplitude of input signals due to the drops across the various members intermediate said input terminal and said one member, said members being diodes, said stages including controlled rectifiers, said means including resistors connected between the anodes of said controlled rectifiers and the cathodes of said diodes, said input circuits for said stages including resistors connected intermediate the gates and cathodes of said controlled rectifiers, said one member being a transistor, and capacitors connected between said members and the input circuits of the stages with which said members are associated.

No references cited.

JOHN S. HEYMAN, *Primary Examiner.*